June 26, 1956          H. M. CONDON          2,752,252
METHOD OF PRODUCING A FROZEN MEAT PRODUCT
Filed Sept. 11, 1951          3 Sheets-Sheet 1
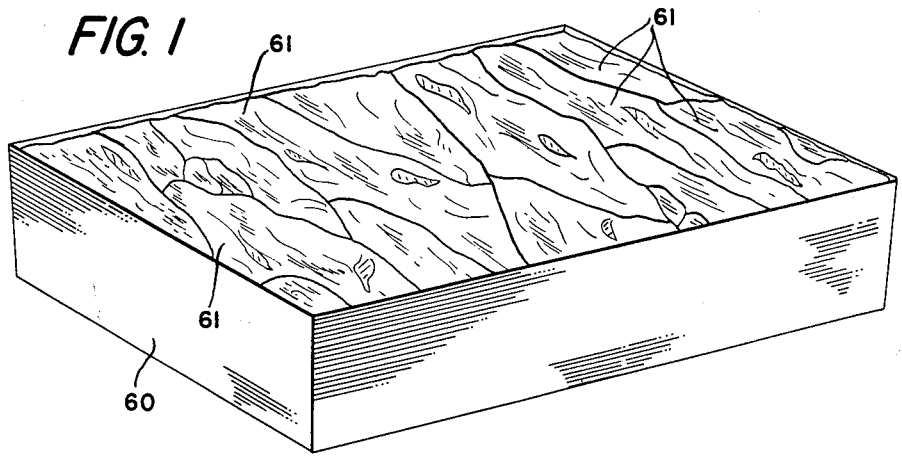
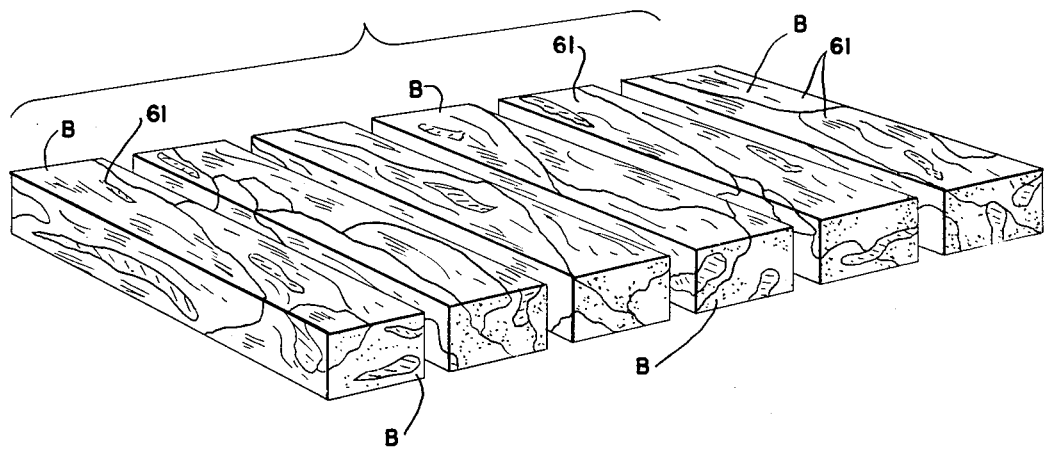
INVENTOR.
HOWARD M. CONDON
BY
*William Cleland*
ATTORNEY June 26, 1956 H. M. CONDON 2,752,252
METHOD OF PRODUCING A FROZEN MEAT PRODUCT
Filed Sept. 1, 1951 3 Sheets-Sheet 2
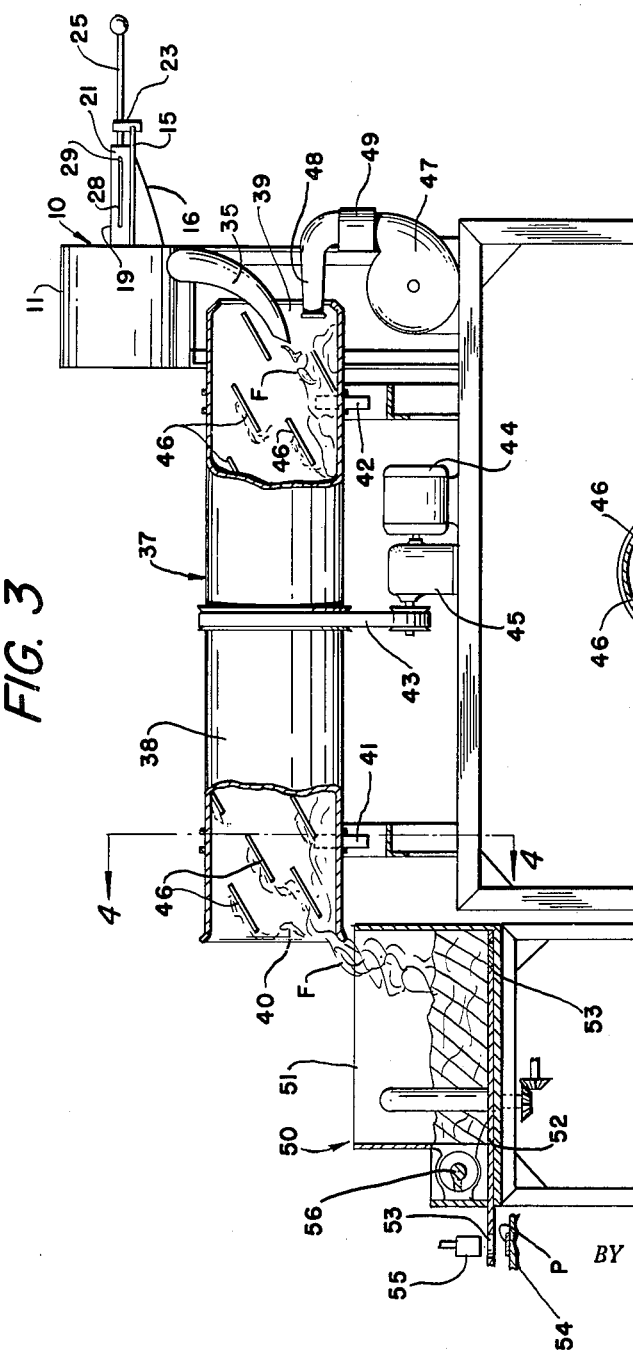
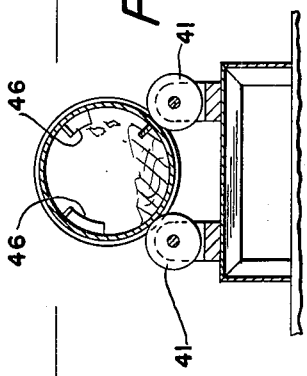
INVENTOR.
HOWARD M. CONDON
BY
William Cleland
ATTORNEY June 26, 1956  H. M. CONDON  2,752,252
METHOD OF PRODUCING A FROZEN MEAT PRODUCT
Filed Sept. 11, 1951  3 Sheets-Sheet 3
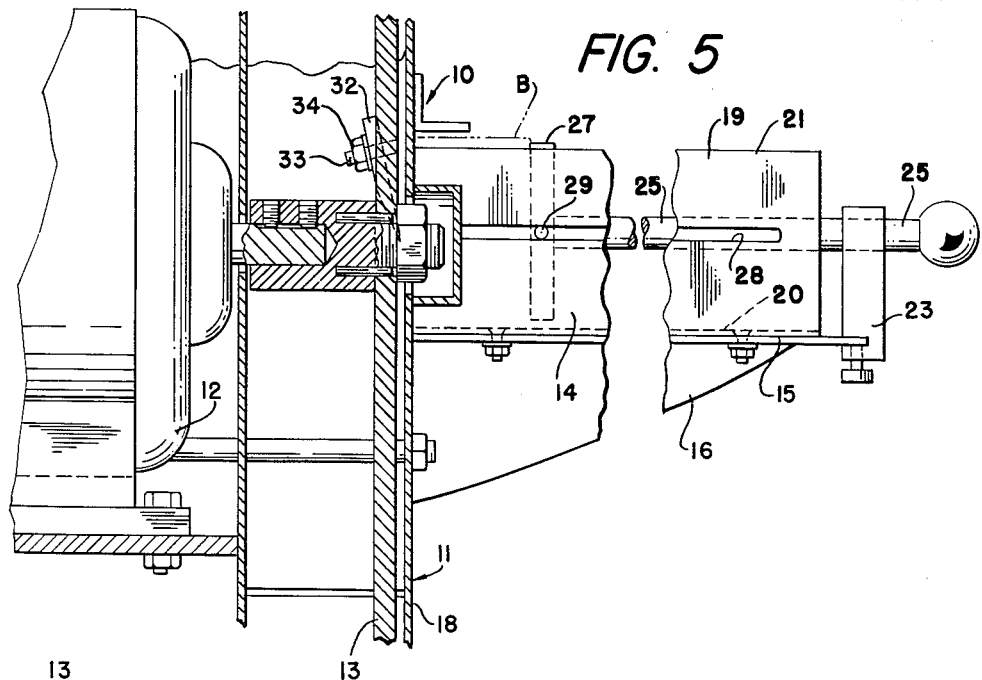
FIG. 5
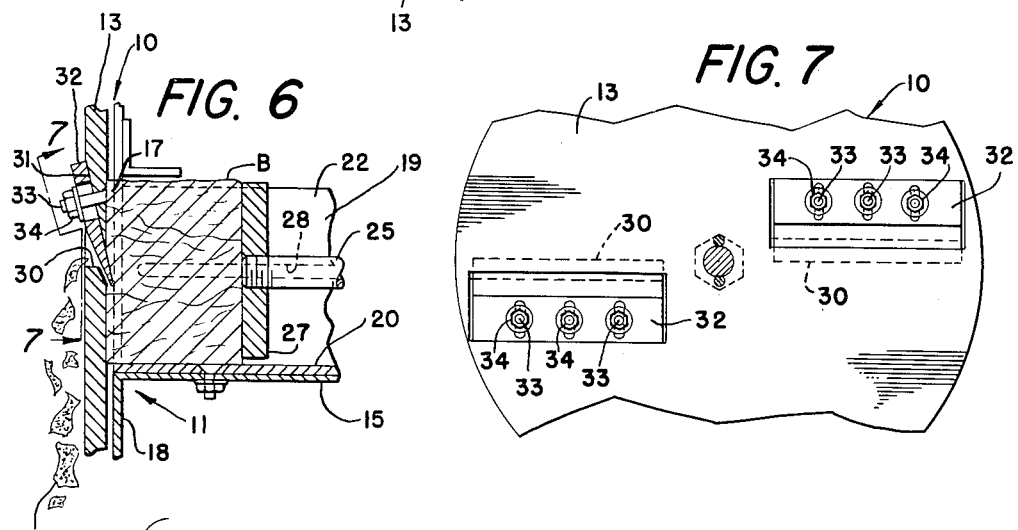
FIG. 6
FIG. 7
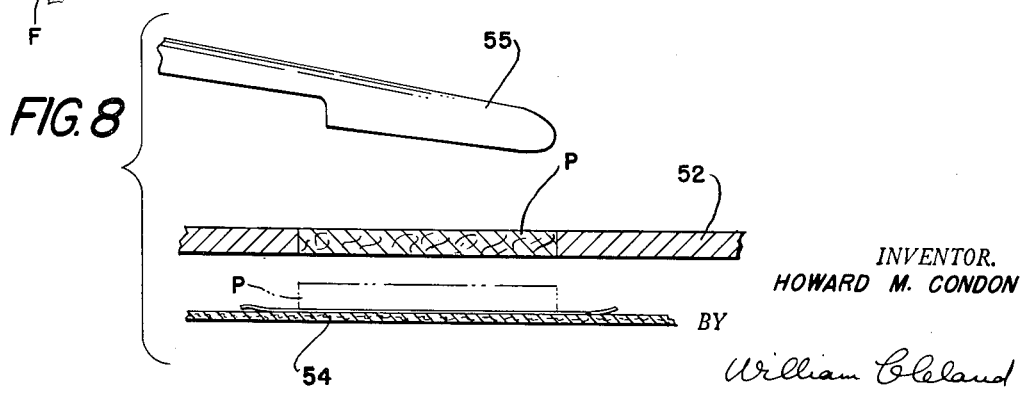
FIG. 8
INVENTOR.
HOWARD M. CONDON
BY
William Cleland
ATTORNEY

United States Patent Office 2,752,252
Patented June 26, 1956

2,752,252

METHOD OF PRODUCING A FROZEN MEAT PRODUCT

Howard M. Condon, Akron, Ohio, assignor to Grand Duchess Steaks, Inc., Akron, Ohio, a corporation of Ohio Application September 11, 1951, Serial No. 246,125

6 Claims. (Cl. 99—194)

This invention relates to a method and apparatus for producing meat products.

The invention is an improvement on Patent No. 2,527,493 issued on October 24, 1950, for "Meat Product and Method of Treating Meat." The method of the patent basically comprises the steps of removing paper thin, relatively small flakes from a hard frozen block of raw meat and compressing a plurality of the flakes into an integrated mass thereof, in patty size and shape for cooking purposes, for example. In following the method as disclosed in the patent the resulting product is a patty in which the flakes have become impalpable, either by the flakes being softened by thawing in the mass or at least partially thawing before the mass is formed. In large scale production, however, it has been found that if the flakes are allowed to thaw at room temperature, sufficiently to allow the flakes to become reintegrated in the mass upon forming the same, the machines used for forming the patties may not be working at full capacity, and the natural red color and the flavor of the meat in the patties may be lost to a certain extent. If, on the other hand, the flakes are used too soon after the flaking operation the weight, consistency, and fullness of the patties may be adversely affected, because presently available patty machines are not readily capable of forming flakes which are in relatively hard frozen condition.

It is a primary purpose of this invention to provide a method and apparatus by which thin flakes of raw meat, removed from a hard frozen block of the meat, are tempered to a relatively softened state which permits substantially speedy, continuous feeding thereof to an automatic patty-forming machine, the flakes thereby being in a softened condition by which they become impalpable in the mass thereof constituting the patty.

Another object of the invention is to provide a method and apparatus of the character described, by which there will be minimum lapse of time between reduction of the frozen block of meat to flakes and refreezing the patties after forming the same from the flakes as described, so that the original flavor and natural red color of the meat is preserved in the patties to the fullest extent.

These and other objects of the invention will be manifest from the following brief description and the accompanying drawings.

Of the accompanying drawings:

Figure 1 is a top perspective view illustrating a container of meat as used in an initial step of the process.

Figure 2 is a similar view showing in part a subsequent step in which the meat has been frozen and cut into smaller parts.

Figure 3 is a side elevation partly broken away and in section, showing apparatus for carrying out the process of the invention.

Figure 4 is a vertical cross-section taken substantially on the line 4—4 of Figure 3.

Figure 5 is an enlarged fragmentary side view partly broken away and in section, of a meat flaking machine used in said process.

Figure 6 is another fragmentary view of the flaking machine, taken through one of the knives of a rotary cutter thereof and illustrating a block of meat being flaked in the machine.

Figure 7 is a fragmentary view of the rotary cutter disc and knives, taken substantially on the lines 7—7 of Figure 6.

Figure 8 is a fragmentary view of a portion of a patty-forming machine, shown at the extreme left of Figure 3.

Referring first to Figures 3, 5, 6 and 7, there is shown a flaking machine 10 for slicing a block B of solid frozen raw meat, the machine including the housing 11 which encloses power-operated driving means 12 for driving rotary cutter disc 13, also within the housing, the disc being adapted to be cooperatively engaged by one end of the frozen block B.

For supporting a said frozen block B, as described, there is provided a support 14, including a horizontal platform 15 extending outwardly from said housing 11, and having spaced vertical reinforcing braces 16 affixed to the housing. Mounted on said platform adjacent a rectangular opening 17 in a front wall 18 of the housing may be a U-shaped trough 19 having a bottom wall 20 and opposite side walls 21 and 22. On the outer end of the platform 15 is an apertured guide member 23, through which a manually operable plunger rod 25 is shiftably received the plunger rod having connected to its inner end a rectangular pusher plate 27. Plate 27 has pins 29 on opposite sides thereof slidably receivable within aligned horizontal slots 28 in the walls 21 and 22 of the trough 19. The arrangement is such that the pusher plate 27 is movable inwardly by pushing the rod 25 to urge the frozen block B through the opening 17 (see Figure 6) in the front housing wall 18, into engagement with the outwardly presented face of the rotary disc 13.

The rotary cutter disc 13 has provided therethrough a pair of diametrically oppositely disposed radial slots 30, 30, oppositely off-set as shown in Figure 7, with respect to a transverse centerline of the disc, each of said slots having chamfered inner edge portions 31. A pair of cutter blades 32, 32 having beveled cutting edges, are adjustably and removably secured against said chamfered edges at an angle of approximately ten degrees (10°) from a vertical plane, as by means of spaced studs 33 fixed on said cutter disc to extend through slots in the blade, and nuts 34 threaded on the free ends of the studs. Thus, the thickness of the slices cut by the blades is controlled by varying the amount the respective blades protrude beyond the outer face of the cutter disc. Additional pairs of similar cutter blades 32 may be provided in balanced relation on the disc 13, as necessary for increasing the speed of the cutting operations and/or varying the size of flakes cut from the blocks B. Flakes F removed from the block B by the rotary cutter (see Figure 6) may be discharged from the cutting machine through a chute 35 into a tempering conveyor 37, to be described.

The tempering conveyor 37 as shown includes an elongated cylinder 38 having an inlet opening 39 at one end, through which the chute 35 of the flaking machine extends, and a discharge opening 40 at the opposite end. The cylinder 38 is suitably rotatably mounted on sets of rollers at 41 and 42 and rotated about a horizontal axis, as by belt means 43 driven by a motor 44, through a variable speed reducing mechanism 45. Provided within the cylinder 38 may be suitable conveyor means, such as angularly disposed vanes 46, adapted to engage the flakes of meat received at said inlet opening end and tumble the same within the cylinder while at the same time feeding the flakes toward said discharge opening 40. While the flakes are thus tumbled and moved within the cylinder 38, heated air is blown through the cylinder to temper the flakes to desired softened condition for purposes to be described. To this end, a blower 47 has a nozzle 48 projecting into said inlet opening 39, and a suitable heater 49 is provided for heating the air before passing through the nozzle.

At the discharge opening 40 of the cylinder 38 is a patty-forming machine 50, including a container 51 for receiving the tempered flakes F from said discharge opening, and a rotating disc 52 having holes 53 therethrough within which patties P are formed, of flakes F. Suitable ejecting means 55 removes the formed patties from the disc openings onto a conveyor belt 54 as the disc is rotated. The patty machine includes a suitable rotating worm screw 56 for gently forcing flakes F into each forming recess 53 to assure accurate forming of the patties.

The operation of the apparatus described above will be best understood in connection with a description of the improved method of the invention, as follows:

First, chunks of raw meat, from which all bones, excess fat and the gristle have been removed, are compacted into stainless steel pans 60 or in containers of other material, including cardboard, the filled containers being placed between the freezing plates of a fast freezing unit (not shown) to condition the meat to hard frozen state throughout (usually freezing the meat to anywhere from 0° F. to 40° below 0° F.). For the present purposes the container 60 may be 24" x 16" x 6", or adapted to contain approximately fifty-five pounds of the meat in pieces 61, 61 ranging from one to ten pounds, although much smaller pieces usually available in normal plant operations may be included. Figure 1 shows the pieces 61 layered widthwise across the container in generally longitudinally coextending relation and the pieces are arranged as much as possible to have the superposed pieces substantially overlapping each other for purposes which will be understood later.

After the layered meat is thus quick-frozen in the trays 60 the resulting hard frozen blocks are removed from the trays and cut into two slabs which in turn are cut into six blocks B approximating 16" x 4" x 3" in size, as shown in Figure 2. Thus, each block B will have therein a plurality of coextending strips 61 and/or parts thereof, the average cross-section of which will be a small fraction of the area of block B. The hard frozen blocks B may now be tempered to be hard frozen at a temperature within a range between 0° F. and 32° F. for the flaking operation to be described, although it is a scientific fact the highest temperature at which the blocks are hard frozen may be lower than 32° F., depending upon certain conditions relating to the method of freezing, variations in the moisture content due to age and fatness of the animal (Meat and Meat Foods, by Lloyd B. Jensen, Ph. D., page 22).

Referring now to Figures 5, 6 and 7, a tempered block B is positioned on the supporting platform 15 in transverse alignment with opening 17 in wall 18 of the flaking machine 10 (see Figure 6). With the rotary disc 13 rotated continuously at high speed, in clockwise direction as viewed from the right of Figures 5 and 6, the pusher plate 27 is moved to urge the block B toward flat engagement with the outer face of disc 13, in the path of the revolving blades 32 thereof. Upon continued application of steady pressure to the block against the fast rotating disc, the projecting edges of the blades 32 will progressively and very rapidly cut paper-thin slices from the end of the block. For several reasons each slice falls from the machine as a plurality of relatively small, paper-thin flakes F of raw meat. In the first place, each slice is generally composed of a number of segments cut from a corresponding number of elongated strips 61 or parts thereof in the sliced block B. Other considerations affecting the size of the flakes are the speed of rotation of disc 13, the number of blades 32 on the disc, and the hardness of the block. It has been found, for example, that if the block is frozen too hard, say to substantially below 0° F. the flakes will fall away from the cutter substantially as a powder, whether the block is composed of segments of meat or is all in one piece. To avoid this powdering of the flakes and to control the size of the flakes it has been determined that with use of two blades on a disc rotating at approximately 1,750 R. P. M., and providing the block B composed of pieces 61 and in hard frozen condition between 20° to 25° above 0° F., the flakes will be of highly satisfactory size averaging from one quarter inch square to two inches square in broad lateral area. Under the conditions described the flakes are of course varied in shape as well as size.

Referring now to Figure 3, the flakes F are guided through chute 35, through the inlet opening 39 of the rotating cylinder 37, which by means of the angularly disposed vanes 46 tumbles the flakes while feeding the same toward the discharge opening 40. Heated air circulated within the cylinder 37 by the blower 47 is effective to temper the flakes to a relatively softened state in which the frosty appearance is removed by the time the flakes reach said discharge end. This tempering step facilitates a patty-forming step to be described later. It should be understood, however, that while the flakes may thus be thawed to relatively soft condition in which the natural red color of raw beef, for example, appears, this does not mean that the flakes are warm to touch. In other words, for rapidly continuously forming the flakes in a fast-operating patty machine the flakes should be within a temperature range between 25° to 32° above 0° F. Thus, it is seen that the flakes may be satisfactorily cut at a low temperature upwardly closely approaching said temperature of 32° F., or the top of said hard frozen temperature range while they appear to be in satisfactorily softened condition for the patty-forming operation when downwardly closely approaching the top of said temperature range. Other means may be utilized for this tempering step. As for example, the flakes may be passed along a chute, at least a portion of which is heated by means of a heating element such as steam or hot water coils.

The flakes F, in tempered or softened condition, are ejected from the discharge end of cylinder 37 into the container 51 of patty-machine 50, upon the rotating patty-forming discs 52. Flakes compressed into holes 53 in the disc 52 form patties P, which are progressively ejected onto a conveyor 54, by the automatic knock-out device 55, the patties being carried in succession to a suitable packaging station (not shown). Each patty of suitable size and shape for cooking purposes (three, four, five and sometimes six to a pound of meat) is inherently composed of a multiplicity of such flakes. The flakes are stated as being "inherently" composed in the patties because in the compacted mass constituting each patty the flakes become impalpable and the resulting product is a solid body in which the flakes cannot be discerned, either by feeling or by appearance to the naked eye. That is, the flakes F unite to form a solid mass much in the manner that snowflakes are compressed to form a snowball.

The formed patties, after being packaged, and before the temperature of the meat has been raised materially above 32° F., are placed in a quick-freezing unit and frozen to hardened condition throughout, in which condition the packaged patties are preferably maintained until ready for use.

By the method described solid meat of tough, fibrous consistency may be virtually taken apart and reintegrated into solid masses of tender non-fibrous meat of uniform consistency and flavor. The non-fibrous structure of the meat is materially enhanced if, in layering the strips 61 in container 60 (see Figure 1), care is taken to have the natural grain or fibre of the meat run generally lengthwise of the coextending strips 61. The flavor of the product is enhanced if during said layering fat naturally in the strips 61 is carefully proportioned throughout the container 60.

The patties (or steaks) P may be cooked by placing them, while still frozen, in a hot pan, and frying or panbroiling for 1½ minutes on each side.

Modifications of the invention may be resorted to without departing from the spirit thereof or the scope of the appended claims.

What is claimed is:

1. A process of treating meat which comprises the steps of fast freezing a block of raw meat at a temperature range of 0° F. to —40° F. to be in substantially hard frozen state throughout, tempering the hard frozen block to a temperature between 0° F. and 25° F., slicing from the tempered block relatively thin flakes of meat, tempering the flakes to be within a temperature range of 25° F. to 32° F., compressing a multiplicity of the tempered flakes into a compact integrated mass in which the softened flakes are thereby substantially impalpable in the mass, and freezing the compacted mass to hardened state throughout.

2. A process of treating meat which comprises the steps of fast freezing a block of raw meat to hard frozen condition, tempering and slicing said block to provide flakes at a temperature within a range between 25° F. and upwardly closely approaching 32° F., above zero, compressing a multiplicity of the tempered flakes into a compact integrated mass in which the tempered flakes are thereby substantially impalpable in the mass, and freezing the compacted mass to hardened state throughout.

3. A process of treating meat which comprises the steps of providing pieces of raw meat in generally coextending relation to form a composite block, freezing the composite block to a temperature below 0° F. to be in substantially hard state throughout, tempering the composite block to a temperature not exceeding 25° F., slicing relatively thin flakes of meat from said hard frozen block, tempering said flakes in a heated environment to relatively softened condition within a temperature range from 25° to 32° above 0° F., whereby upon compressing said softened flakes into compact masses the softened flakes are thereby substantially impalpable in the masses, and freezing the compact masses to hardened state throughout.

4. A process of treating meat which comprises the steps of providing a block of raw meat in substantially hard frozen state throughout within a temperature range between 20° F. to 25° F. above 0° F., slicing from the hard frozen block relatively thin flakes of meat, tempering said flakes to within a range of 25° to 32° F. above zero, compressing a multiplicity of tempered flakes into a compact integrated mass in which the resultantly softened flakes are thereby substantially impalpable in the mass, and freezing the compacted mass to hardened state throughout, said tempering step comprising tumbling the flakes through heated air.

5. A process of treating meat which comprises the steps of providing a block of raw meat in substantially hard frozen state throughout and at a temperature below 25° F., slicing from the hard frozen block relatively thin flakes of meat, tumbling said flakes in heated air to temper the same to a temperature within a range of 25° to 32° above 0° F., compressing the tempered flakes into compact integrated masses in which the flakes of the respective masses are substantially impalpable, and freezing the masses to hardened state throughout.

6. A process of treating meat which comprises the steps of providing a block of raw meat in substantially hard frozen state throughout and at a temperature below 25° F., slicing from the hard frozen block relatively thin flakes of meat, progressively conveying and tumbling said flakes through a tempering zone in which heated air circulates around the tumbling flakes to temper the same to a temperature within a range of 25° to 32° above 0° F., compressing the tempered flakes into compact integrated masses in which the flakes of the respective masses are substantially impalpable, and freezing the masses to harden state throughout.

References Cited in the file of this patent

UNITED STATES PATENTS

| | | |
|---|---|---|
| Re. 23,482 | Condon | Apr. 29, 1952 |
| 2,224,390 | Holly | Dec. 10, 1940 |
| 2,255,796 | Linane et al. | Sept. 16, 1941 |
| 2,397,446 | Tansley | Mar. 26, 1946 |
| 2,521,849 | Hopkins et al. | Sept. 12, 1950 |
| 2,527,493 | Condon | Oct. 24, 1950 |